US010445495B2

(12) United States Patent
Sharifi Mehr

(10) Patent No.: US 10,445,495 B2
(45) Date of Patent: Oct. 15, 2019

(54) BUFFER OVERFLOW EXPLOIT DETECTION

(71) Applicant: Amazon Technologies, Inc., Reno, NV (US)

(72) Inventor: Nima Sharifi Mehr, Vancouver (CA)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 15/894,611

(22) Filed: Feb. 12, 2018

(65) Prior Publication Data
US 2018/0349597 A1 Dec. 6, 2018

Related U.S. Application Data

(63) Continuation of application No. 15/187,006, filed on Jun. 20, 2016, now Pat. No. 9,892,253.

(51) Int. Cl.
*G06F 21/00* (2013.01)
*G06F 21/52* (2013.01)

(52) U.S. Cl.
CPC ........ *G06F 21/52* (2013.01); *G06F 2221/033* (2013.01)

(58) Field of Classification Search
CPC .......................... G06F 2221/033; G06F 21/52
USPC .......................................................... 726/23
See application file for complete search history.

(56) References Cited

U.S. PATENT DOCUMENTS

| | | |
|---|---|---|
| 6,832,381 B1 | 12/2004 | Mathur |
| 7,895,579 B2 * | 2/2011 | Guerrera ............. G06F 11/3419 717/125 |
| 8,321,843 B2 * | 11/2012 | Lanner ................ G06F 9/44505 717/121 |
| 8,561,198 B2 | 10/2013 | Singh |
| 8,938,571 B1 | 1/2015 | Vincent |
| 9,027,000 B2 * | 5/2015 | Guerrera ............. G06F 11/3419 717/125 |
| 9,471,404 B1 | 10/2016 | Ambrosio |
| 9,619,654 B2 | 4/2017 | Dolan-Gavitt |

(Continued)

OTHER PUBLICATIONS

Han, Hong, et al. "AI FD: A runtime solution to buffer overflow attack." Machine Learning and Cybernetics, 2007 International Conference on. vol. 6. IEEE, 2007.
Cheng, Julia Yu-Chin, Tzung-Shian Tsai, and Chu-Sing Yang. "An information retrieval approach for malware classification based on Windows API calls." Machine Learning and Cybernetics (ICMLC), 2013 International Conference on. vol. 4. IEEE, 2013.

(Continued)

*Primary Examiner* — Syed A Zaidi
(74) *Attorney, Agent, or Firm* — Hogan Lovells US LLP

(57) ABSTRACT

A call to a memory management application programming interface (API) that results in a buffer overflow due to inaccurate bounds checking could potentially leave the system vulnerable to being exploited by a third party. Approaches presented herein can monitor calls to these APIs in order to determine typical memory sizes passed to these APIs. During an initial baselining period a number of profiles are generated that indicate expected memory size parameters under various different call conditions, such from specific sources or call stacks. Comparing subsequently received API calls against the expected values from the relevant profile enables the legitimacy of an API call to be determined with relatively high accuracy. A suspicious call is identified based at least in part upon determining that the memory size of the call falls outside an expected range for that API and the relevant context.

20 Claims, 5 Drawing Sheets

(56) References Cited

U.S. PATENT DOCUMENTS

| | | |
|---|---|---|
| 9,754,105 B1 | 9/2017 | Lopez-Chicheri et al. |
| 2002/0019887 A1 | 2/2002 | Moore |
| 2003/0192036 A1* | 10/2003 | Karkare .............. G06F 11/3466 717/158 |
| 2007/0294673 A1* | 12/2007 | Guerrera ............. G06F 11/3419 717/130 |
| 2008/0270855 A1 | 10/2008 | Bae |
| 2011/0113405 A1* | 5/2011 | Guerrera ............. G06F 11/3419 717/125 |
| 2012/0011493 A1 | 1/2012 | Singh |
| 2012/0079596 A1* | 3/2012 | Thomas ................. G06F 21/55 726/24 |
| 2013/0160128 A1 | 6/2013 | Dolan-Gavitt |
| 2015/0350234 A1 | 12/2015 | Reno |
| 2016/0164901 A1 | 6/2016 | Mainieri |

OTHER PUBLICATIONS

Aafer, Yousra, Wenliang Du, and Heng Yin. "Droidapiminer: Mining api-level features for robust malware detection in android." International Conference on Security and Privacy in Communication Systems. Springer, Cham, 2013.

D. Garbervetsky, C. Nakhli, S. Yovine, H. Zorgati, Program Instrumentation and Run-Time Analysis of Scoped Memory in Java, In Electronic Notes in Theoretical Computer Science, vol. 113, 2005, pp. 105-121.

Lim, Hyun-il, and Taisook Han. "Analyzing stack flows to compare Java programs." IEICE Transactions on Information and Systems 95.2 (2012): 565-576.

Notice of Allowance issued in U.S. Appl. No. 15/187,006, dated Oct. 17, 2017.

\* cited by examiner

BUFFER OVERFLOW EXPLOIT DETECTION

This application is a continuation of allowed U.S. application Ser. No. 15/187,006, filed Jun. 20, 2016, entitled "BUFFER OVERFLOW EXPLOIT DETECTION," which is incorporated herein by reference for all purposes.

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Users can perform tasks such as storing data to various types of resources offered by a resource provider. In some instances, a process executing on behalf of a customer will attempt to write data to a data buffer in the system. If there is insufficient bounds checking, such that the data written exceeds the allocation, then the data can corrupt data value in memory addresses adjacent the destination buffer. If a system contains a buffer overflow condition in conjunction with processing untrusted data, then an adversary can attack the system with a buffer flow exploit.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of data in an electronic environment. In particular, various approaches provide for the monitoring of calls to an application programming interface (API) or other such interface to determine whether those calls are suspicious and could potentially result in a buffer overflow that could potentially leave the system vulnerable to being exploited by a third party. A buffer overflow exploit can occur when data written to a buffer is able to corrupt data values in memory addresses adjacent to the destination buffer due to, for example, insufficient bounds checking. This can occur when copying data from one buffer to another without first checking that the data fits within the destination buffer. If a system contains a buffer overflow condition in conjunction with processing untrusted data, then an adversary may attack the system with a buffer overflow exploit.

Approaches in accordance with various embodiments can instrument the system binaries to profile memory management APIs in order to determine typical parameters passed to these APIs as memory sizes. During an initial baselining period a number of profiles can be generated that can indicate expected memory size parameters under various call conditions, such as calls to various APIs, from various sources, and/or with various call stacks. The expected memory size parameters can be determined in at least some embodiments by determining all memory values for an API (and relevant parameters or call stacks, etc.) and determining which values occur with a minimum frequency or with a statistically significant occurrence. Other approaches can be used as well, such as to determine expected ranges or distributions of values based on non-outlier values received during the baselining period, etc. By comparing subsequently received API calls against the values of the relevant profile, the legitimacy of an API call can be determined with relatively high accuracy. If a suspicious call is detected based at least in part upon determining that the memory size of the call falls outside an expected range for that API and the relevant context, the system can alarm, block the call, or take another such action.

Various other such functions can be used as well within the scope of the various embodiments as would be apparent to one of ordinary skill in the art in light of the teachings and suggestions contained herein.

Figure 1:
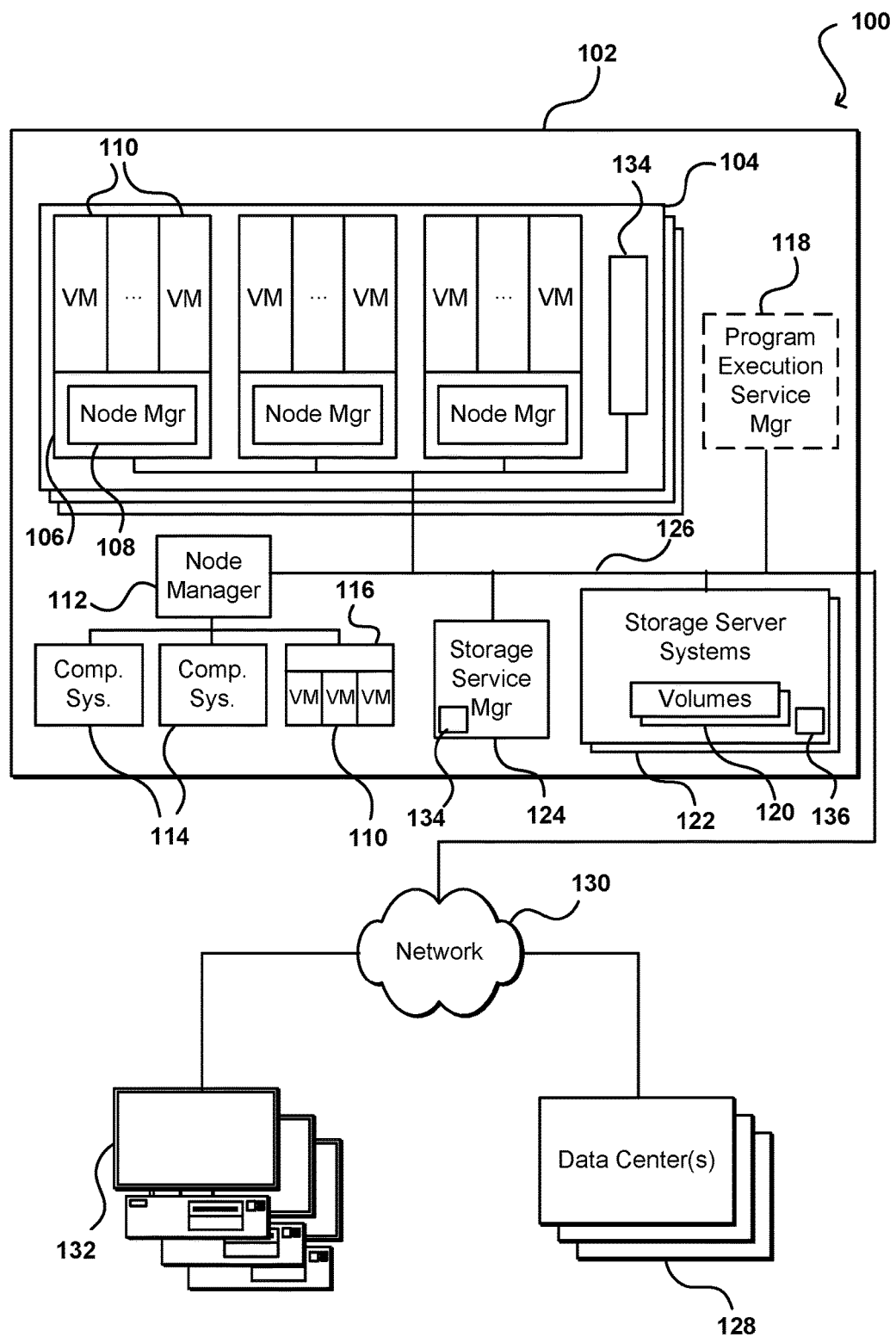
FIG. 1 illustrates an example environment in which various embodiments can be implemented.

FIG. 1 illustrates an example network configuration 100 in which multiple computing systems are operable to execute various programs, applications, and/or services, and further operable to access reliable non-local block data storage, such as under the control of data storage service and/or program execution service, in accordance with various embodiments. In particular, a program execution service manages the execution of programs on various host computing systems located within a data center 102, and a data storage service uses multiple storage server systems 122 at the data center to provide reliable non-local block data storage to those executing programs. Multiple remote archival storage systems (not shown) external to the data center may also be used to store additional copies of some portions of some data storage volumes.

In this example, a data center 102 (or other shared resource environment) includes a number of racks, each rack 104 including a number of host computing devices 106, as well as an optional rack support computing system 134. The host computing systems 106 on the illustrated rack 104 each host one or more virtual machines 110 in this example, as well as a node manager 108 associated with the virtual machines on that host computing system to manage those virtual machines. One or more other host computing systems 116 may also each host one or more virtual machines 110 in this example. Each virtual machine 110 may act as an independent computing node for executing one or more program copies (not shown) for a user (not shown), such as a customer of the program execution service. In addition, this example data center 102 further includes additional host computing systems 114 that do not include virtual machines, but may nonetheless each act as a computing node for one or more programs (not shown) being executed for a user. In this example, a node manager 112 executing on a computing system (not shown) distinct from the host computing systems 114 and 116 is associated with those host computing systems to manage the computing nodes provided by those host computing systems, such as in a manner similar to the node managers 108 for the host computing systems 106. The rack support computing system 134 may provide various utility services for other computing systems local to its rack 104 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example, an optional computing system is also illustrated that executes a program execution service manager 118 for the program execution service to assist in managing the execution of programs on the computing nodes provided by the host computing systems located within the data center 102 (or optionally on computing systems located in one or more other data centers 128, or other remote computing systems 132 external to the data center). As discussed in greater detail elsewhere, a program execution service manager may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the program execution service manager 118 may coordinate with the node managers 108 and 112 to manage program execution on computing nodes associated with the node managers, while in other embodiments the node manager may not assist in managing such execution of programs.

In this example, the data center 102 also includes a data storage service manager 124 for managing the availability of non-local block data storage to programs executing on computing nodes provided by the host computing systems located within the data center (or optionally on computing systems located in one or more other data centers 128, or other remote computing systems 132 external to the data center). In particular, in this example, the data center 102 includes a pool of multiple data storage server systems 122, which each have local storage (i.e., block storage) for use in storing one or more volume copies 120. Access to the volume copies 120 is provided over the internal network(s) 126 to programs executing on various computing nodes 110 and 114. As discussed in greater detail elsewhere, a data storage service manager may provide a variety of services related to providing non-local block data storage functionality, including the management of user accounts (e.g., creation, deletion, billing, etc.); the creation, use and deletion of data storage volumes and snapshot copies of those volumes; the collection and processing of performance and auditing data related to the use of data storage volumes and snapshot copies of those volumes; the obtaining of payment from customers or other users for the use of the volumes and snapshot copies of those volumes; etc. In some embodiments, the data storage service manager may coordinate with the node managers to manage use of volumes by programs executing on associated computing nodes, while in other embodiments the node managers may not be used to manage such volume use. In addition, in other embodiments, one or more data storage service managers may be structured in other manners, such as to have multiple instances of the data storage service manager executing in a single data center (e.g., to share the management of non-local block data storage by programs executing on the computing nodes provided by the host computing systems located within the data center), and/or such as to have at least some of the functionality of a data storage service manager being provided in a distributed manner by software executing on some or all of the data storage server systems 122 (e.g., in a peer-to-peer manner, without any separate centralized service manager).

In this example, the various host computing systems, data storage server systems, and computing systems are interconnected via one or more internal networks 126 of the data center 102, which may include various networking devices (e.g., routers, switches, gateways, etc.) that are not shown. In addition, the internal networks 126 are connected to an external network 130 (e.g., the Internet or other public network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 128 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the data storage service). In addition, one or more of the other computing systems may be archival storage systems (e.g., as part of a remote network-accessible storage service) with which the data storage service may interact, such as under control of one or more archival managers (not shown) that execute on the one or more other computing systems or instead on one or more computing systems of the data center, as described in greater detail elsewhere. Furthermore, while not illustrated here, in some embodiments, some of the server systems 122 may further be interconnected with one or more other networks or other connection mediums, such as a high-bandwidth connection over which the server systems 122 may share volume data (e.g., for purposes of replicating copies of volumes and/or maintaining consistency between primary and mirror copies of volumes), with such a high-bandwidth connection not being available to the various host computing systems in such embodiments.

It will be appreciated that the example of FIG. 1 has been simplified for the purposes of explanation, and that the number and organization of host computing systems, server systems, and other devices may be much larger than what is depicted in FIG. 1. For example, as one illustrative embodiment, there may be thousands of computing systems per data center, with some of those computing systems being host computing systems that may each host fifteen virtual machines, and/or with some of those computing systems being server systems that may each store several volume copies. If each hosted virtual machine executes one program, then such a data center may execute as many as sixty thousand program copies at one time. Furthermore, hundreds or thousands (or more) volumes may be stored on the server systems, depending on the number of server storage systems, size of the volumes, and number of mirror copies per volume. It will be appreciated that in other embodiments, other numbers of computing systems, programs and volumes may be used.

Figure 2A:
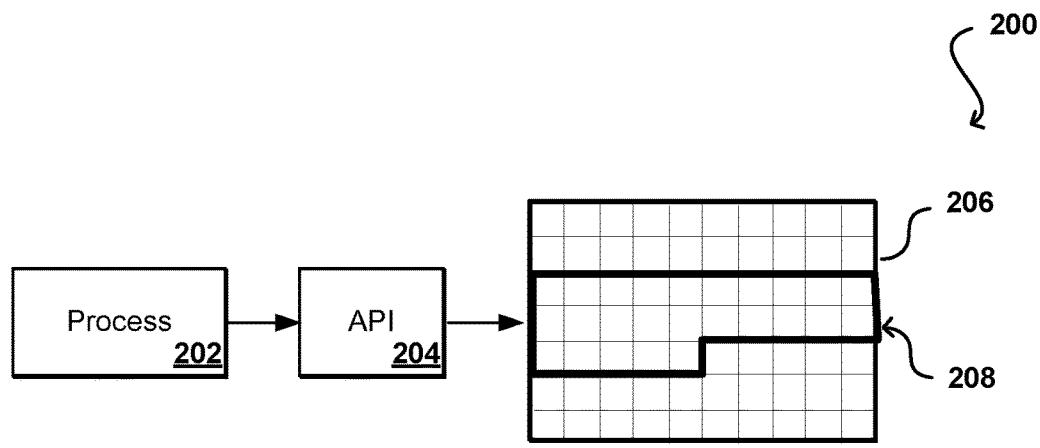
FIGS. 2A and 2B illustrate an example buffer overflow that can be detected in accordance with various embodiments.
Figure 2B:
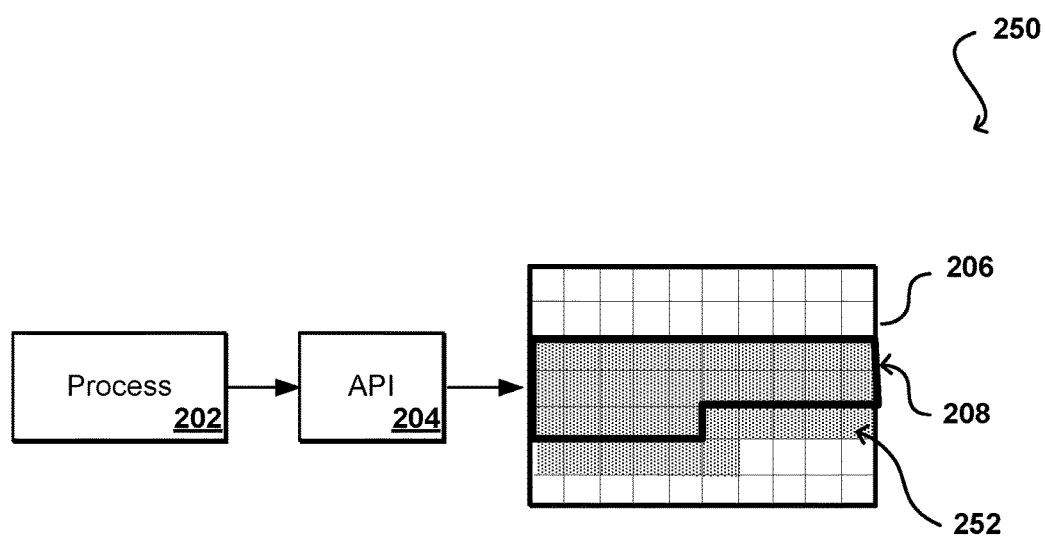

In various instances, a process or virtual machine executing in such an environment will want to copy, move, or store data to a storage device or service. In many instances, this will involve the process calling an application programming interface (API) or other such interface in order to allocate the appropriate amount of memory and then copy or write the data to the allocated memory. FIG. 2A illustrates an example 200 of such a situation, wherein a process 202 calls an API 204, which causes an amount 208 of available memory on a storage device 206 to be allocated for the data to be written. When allocating memory, however, it is possible that untrusted data can be used, which can impact the boundary of the memory allocated. For example, if untrusted data is copied to a location where the boundaries were not properly verified, there can be an issue with the boundary size as it may be different than expected. For example, in the situation 250 of FIG. 2B, the amount of data 252 written to the storage device 206 exceeds the boundary 208 of the allocation. Overflowing the allocation or buffer can occur in some examples by exploiting some mistake at the coding level in the context of memory management. An untrusted entity can then send in more bytes that is expected or allocated, resulting in an overflow, and based upon where the stack ends up that sequence of extra bytes could end up executing as executable code, as the sequence goes in the stack which is essentially executable memory. From there the problems in the memory management can be exploited.

It therefore can be desirable to attempt to detect or predict buffer overflow exploits or attacks, and potentially react to them in some context. Static code scanning or other such approaches can be used, but these have blind spots when the code is not clear as to where the boundaries are checked and from where the values for the memory checks are received. It can be desirable to be able to detect the problems before the code is delivered to a production system.

Accordingly, approaches in accordance with various embodiments attempt to build a profile of the various memory management API calls within the data storage environment. Based at least in part upon the profiles, the boundaries or amounts of memory for each of these memory management APIs can be verified. When performing an action such as to copy memory from one location to another, the various APIs used and the amount of data passed through those APIs for a particular call can be monitored. Different processes or places in the code might typically pass specific lengths or amounts of data, such that by monitoring the APIs the expected lengths can be determined. Anything falling outside those expected lengths, or appreciably outside those expected lengths, can then be flagged as suspicious and worth investigation. In one embodiment, the size of memory to be copied can be determined before the actual copying is initiated. This can be done using a relatively simple approach, but such an approach may result in some errors due to not also determining sufficient context for the action. There might be places in the code where large downloads or uploads are allowed, such that the deviation will be pretty high if those locations are not taken into account. Elsewhere, however, these calls may have pretty standard lengths.

A more accurate approach can attempt to determine and/or attach a context as to where the memory management APIs are called from, and with what parameters. It may not be sufficient to just use, for example, file and line number because this does not address situations where there may be, for example, some level of encapsulation. Accordingly, approaches in accordance with various embodiments can attempt to define the context based at least in part upon the call stack. A monitoring module or component can track each time (or at least various times at which) a memory management API is utilized, and can use that to build a profile. For each API call the relevant call stack can be captured as well, which indicates the sequence of calls from the initial point the code has gone through to get to that memory management API call, as well as the parameters for the call. The call stacks can also be summarized into hashes of the call stacks in order to reduce the size of the summaries and make the process more efficient. In some embodiments the hashes can be further compressed into a bloom filter, which can be used for matching. In some embodiments only a portion of the call stack might be hashed for comparison, such as the last ten calls of a call stack for thirty calls. In some embodiments hashes can be generated for different portions of the call stack, such as where a hash for a portion of the call stack can be used for quick comparison and a hash for the entire stack used where higher confidence is needed, or in other such situations.

As mentioned, the profile can be used to determine whether the amount of data to be passed matches an expected amount of data based at least in part upon the context. Because there can be many different paths or combinations, there may be some amount of deviation allowed before alarming or taking other such action. For example, a standard deviation factor can be used such that a flag will not be raised if a difference from an expected value is less than, for example, three standard deviations.

In some embodiments the various values of the buffers coming in through these API calls can be analyzed to determine whether it resembles shell code, but this can add a significant amount of latency. Instead analyzing the size parameters can be performed very quickly. In some embodiments the size parameters can first be analyzed to attempt to determine an amount deviating from the baseline profile, and those heuristics can then be used to determine whether the buffer contains some type of shell code, which can help to improve accuracy.

In order to build up the profiles, there can be an initial period of learning where the information is gathered and the hashes generated. In some embodiments, a system such as a storage service manager 124, such as the one illustrated in FIG. 1, can cause each of a fleet of servers or server systems 122, managed by that service manager, to capture a portion of the profile during that baselining period, after which the data from across the fleet can be aggregated. The instructions and aggregation can be performed by a behavior profiling process 134 or component executing on the storage service manager 124, although in other embodiments and depending in part upon the scope of the profiling there can be a profiling component 136 on the individual servers or server systems 122, or even on a customer instance, virtual machine, or other such deployment. In some embodiments, there can be multiple such profiling components across a system, network, or environment, and a request can be received that specifies a scope or type of profiling, which can cause the appropriate profiling component to be instructed with respect to the profiling. This can be useful in situations where a customer or other entity wants to detect certain types of anomalies, or anomalies specific to a particular deployment, subsystem, network region, or other such portion of subset of the overall environment.

In at least some embodiments, the learned profile data can also be updated over time, such as once a day in an offline process or continually in a near-real time dynamic process, among other such options. Various machine learning algorithms (i.e., supervised or unsupervised, neural network-based, regression, decision tree, or Bayesian, etc.) can be used to train a new model or update a model with the recently received data, such that the profiles are not only more current but also improve in accuracy over time. Processes for implementing machine learning for purposes such as anomaly detection are disclosed in co-pending U.S. patent application Ser. No. 15/165,221, filed May 26, 2016, and entitled "System for Determining Anomalies Associated with a Request," which is hereby incorporated herein in its entirety. When determining the profile data to use for comparison, in some embodiments a sliding window might be used to only look at trends over the last 30 days, etc. In some embodiments an update might be triggered for a code change or other such event. If there is a significant amount of traffic in the environment, it is possible that only a portion of the traffic will be analyzed in order to conserve resources.

In some embodiments there will be a module loaded inside the executable binary. Its role can be to proxy the calls to the memory management APIs. The calls can be redirected to this new implementation of this proxy in, for example, the routing table of those entry points. From there the profiling can be performed and the call then passed on to the real location. An entity wanting to take advantage of this functionality can then load the binary inside their executables, such as by loading or injecting this proxy module into their process(es). All of the processes being launched on the platform can be externally monitored in some embodiments, with the library or module being injected into the new process to manage and proxy the API calls.

Once the module is present or injected into the process being monitored, such as may be under the direction of the behavior profiling component or another such system or process, the module can proxy the calls and capture information about what is happening inside that module. The module itself does not necessarily have to store everything, as anything learned from a process can be passed along to another process that is residing on the same host. These profile entry points can then be aggregated and the information periodically uploaded to a central service, which can receive the same type of compressed profiles from other instances of the same process on other servers within the same fleet. The information can then be distributed back to all of these servers in the aggregated format, which can be used for detection from that point forward.

As mentioned, the amount of data for an API call can be examined and compared against the relevant profile. If a deviation is detected that it outside the permissible amount, then an action can be taken such as to block the call or generate an alarm. In some embodiments a flag can also be set in the system or the behavior of the system can be adjusted, among other such actions. In some embodiments the central service might wait to determine whether the same type of flagging is detected from other instances of the process across the fleet at substantially the same time. Such behavior can indicate that there might be a change in the legitimate behavior of the system. In some embodiments a value that deviates from an expected value can cause the value to be automatically adjusted to the expected value. For example, if a request is received that requests a smaller allocation than is expected, a larger allocation of expected may be specified instead in order to prevent a buffer overflow or other such situation. There can be rules or guidelines on such changes, however, as changing to a smaller allocation may result in unintended overflows, and various other changes may have various other unintended consequences as well. In some embodiments an administrator or other such person or entity may determine whether such adjustments can be made, and if so which ones and under which circumstances, etc.

As mentioned, various approaches can attempt to balance accuracy with complexity. For example, the monitoring can be kept relatively simple to only determine the methods in the call stack. This can keep the size needed in terms of context relatively small. In at least some embodiments additional parameters can be added as more detailed and accurate analysis is desired. In some embodiments one or more thresholds can be specified to determine the number of entries to monitor in the call stack. Different confidence levels then can be provided based at least in part upon the number of entries being monitored. In some systems custom memory management modules might be implemented, such that the customer may need to identify the custom memory management APIs so they can be monitored and proxied.

In at least some embodiments the system binaries can be implemented to profile memory allocation and data moving and copying APIs and learn about the legitimate, common, or normal parameters passed to these APIs as memory sizes. After a baselining period is passed, such that the profiles can predict all the memory size parameters with a determined accuracy, the system can start alarming on abnormal memory size values passed to these memory management APIs. In a naive implementation, with system level profiling, the profiles for a system after a baselining period might look like the following, where malloc is a memory allocation process and/or API and memcpy is a memory copying process and/or API:

malloc: 2, 20, 25, 8 or range (2,25)
memcpy: 4, 6, 35, 60 or range (4,60)

In such an example, it might be noted that the malloc API is typically called with one of four values for allocation, here 2, 8, 20, or 25. This might also be expressed in some embodiments as a range from 2 to 25 in order to same space and reduce complexity. Similarly, the memcopy API would typically be called with values of 4, 6, 35, or 60.

It is possible, however, that the accuracy of the system level profiling would be poor due to utilizing context data that is too high-level. Approaches can improve the profiling with more fine-grained context association, such as may be given by:

malloc (from Source file: UserManagement.c, Line:20): 2, 8 or range (2,8)
malloc (from Source file: NetworkRouting.c, Line:134): 20, 25 or range (20,25)
memcpy (from Source file: UserManagement.c, Line:25): 4, 6 or range (4,6)
memcpy (from Source file: NetworkRouting.c, Line:180): 35, 60 or range (35,60)

Here, the source files and line numbers used to call the relevant APIs can be included. In this way it can be tracked that the malloc API when called from line 20 of the UserManagement file has expected values of 2 and 8, while when called from line 134 of the NetworkRouting file the expected values are 4 and 6. This helps improve accuracy as the expected values can be broken up according to calling file and line number.

In some embodiments where higher accuracy is desired, the call stack (i.e., the sequence of function calls prior to calling these memory management APIs) along with the source code file name and the line number can be tracked and profiled. A context with more accuracy can help to generalize less and detect an anomalous memory management in its own specific context. The following examples show the above sample profile with inclusion of call stacks:

malloc (from Source file: UserManagement.c, Line:20, call-stack:x->b->malloc): 2
    malloc (from Source file: UserManagement.c, Line:20, call-stack:y->b->malloc): 8
    malloc (from Source file: NetworkRouting.c, Line:134, call-stack:x->p->malloc): 20
    malloc (from Source file: NetworkRouting.c, Line:134, call-stack:y->p->malloc): 25
    memcpy (from Source file: UserManagement.c, Line:25, call-stack:x->b->memcpy): 4
    memcpy (from Source file: UserManagement.c, Line:25, call-stack:y->b->memcpy): 6
    memcpy (from Source file: NetworkRouting.c, Line:180, call-stack:x->p->memcpy): 35
    memcpy (from Source file: NetworkRouting.c, Line:180, call-stack:x->p->memcpy): 60

As illustrated, such an approach can also break down the expected value by the call stack. For example, process x might call component b, which might call the malloc API, with an expected value of 2 bytes. If process y instead calls component b, which calls the malloc API, then the expected value can be 8 bytes. If the malloc API is called with a value that is not in the learned list or range of parameters, then an investigative alarm can be raised or other action taken. The call stack can include various types of information, such as files, processes, name spaces, and so on. In an alternative look up implementation, the value can be compared against the mean and standard deviation of known parameters, such as by using the following example pseudo code:

STANDARD_DEVIATION_FACTOR=3;
    mean=stat.getMean(known_memory_size_params);
    standardDeviation=stat.getStandardDeviation(known_memory_size_params);
    upperBound=mean+(STANDARD_DEVIATOIN_FACTOR*standardDeviation);
    lowerBound=mean-(STANDARD_DEVIATOIN_FACTOR*standardDeviation);

Using such an approach, the value of a call would be considered abnormal if not within the range of (lowerBound, upperBound), where those bounds are based on the mean value of the size parameters with respect to three standard deviations. To reduce the rate of false positives, a number of factors can be aggregated into a threshold for alarming. These factors can include, for example, the number of requests profiled for a given context, the range of time that these requests were profiled, the number of unique values for memory size parameters, or their length of range, or their standard deviation. Some embodiments can also monitor the frequency of calls, since shell code can potentially be injected in an otherwise undetected manner if the calls come in at a sufficiently high rate. In some embodiments a ratio can be determined that indicates how many of the calls hit each stack, as well as the number of calls over a given period of time. The monitoring in some embodiments can be performed for APIs other than memory management APIs as well.

In some embodiments the monitoring and detection can be offered as a service to customers, where customers can indicate the processes to be monitored and the service can perform the appropriate injection. An external security service product can provide profiling agents for customers and optionally install them into their environment, and these agents (as discussed previously) can be responsible for both the behavioral profiling and anomaly detection aspects, although in some embodiments the anomaly detection components may be separate from the behavioral modeling components, among other such options. As mentioned elsewhere herein, an agent in some embodiments can embody code to perform the profiling and anomaly detection, such as by monitoring the memory management APIs of an operating system, as may be running in a virtual machine of the service provider environment. As with any other anomaly detection system, there is a chance for false positives. Therefore, many of the system internals (i.e., callstack-based profiles for calls to memory management APIs) can be surfaced to customers and their systems operators to help manually investigate the issue. Any third party who wants to implement this method can provide many of the systems internals through an appropriate user interface or documentation, etc.

Figure 3:
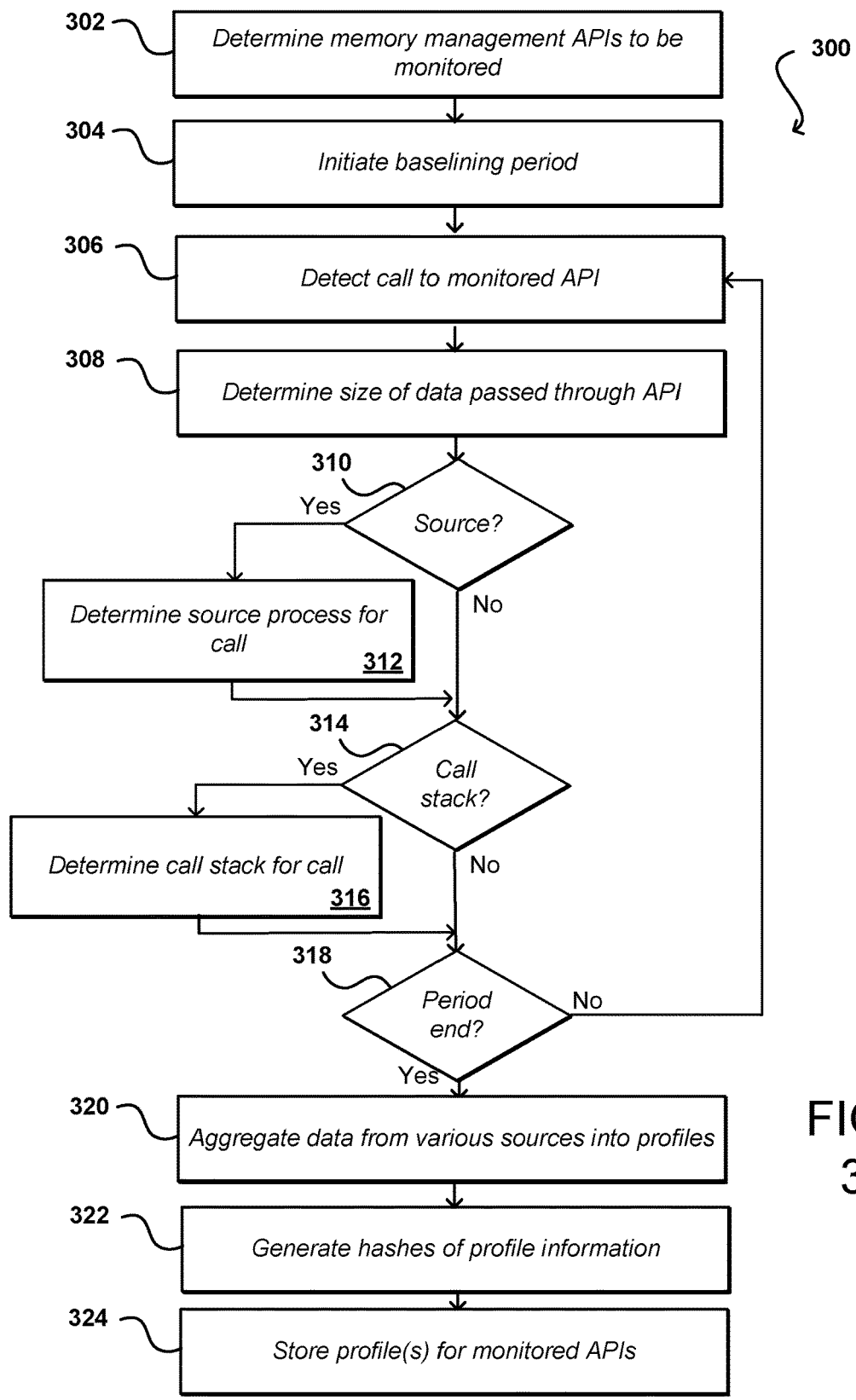
FIG. 3 illustrates an example process for building profiles for various memory management API calls that can be utilized in accordance with various embodiments.

FIG. 3 illustrates an example process 300 for building profiles for various memory management API calls that can be utilized in accordance with various embodiments. It should be understood that for this and other processes discussed herein that there can be additional, fewer, or alternative steps performed in similar or alternative orders, or in parallel, within the scope of the various embodiments unless otherwise specifically stated. In this example, a set of one or more memory management APIs is determined 302 for which monitoring is to be performed. As mentioned, there can be various APIs or other interfaces across a system or environment, which may or may not be related to memory management, and it can be desirable in at least some embodiments to monitor one or more usage aspects for those APIs. In this example, the APIs relate to memory management, specifically tasks that allocate memory for purposes of storing or copying data to a non-transitory computer-readable storage medium. Once the APIs are determined, and one or more processes that call those APIs are identified and an initial baselining period can be initiated 304 wherein the calls to those APIs from the various processes can be monitored.

During the initial baselining period, a call to a monitored API can be detected 306 and the information for the call analyzed to determine 308 the size of data passed through the API. This can include, for example, determining the amount of space requested for allocation or the amount of data actually written to storage, among other such information. If it is determined 310 that information as to source is to be monitored as well, then the source information for the call can be determined 312. As mentioned this can include identifying information for a process, file, line number, or other such information. Another determination can be made 314 as to whether call stack information is to be monitored. As mentioned, a balance can be made between complexity and accuracy, so different implementations may choose to monitor different aspects of the calls. If the call stack is to be monitored, the call stack for the received API call can be determined 316. If it is determined 318 that the baselining period has not yet ended, then the process can continue to analyze subsequently received API calls. Otherwise, the data from various sources (i.e., different servers or systems) can be aggregated 320 into profiles for the various APIs, where different profiles for an API might exist based on the use of source and/or call stack information. In this example, hashes of the profile information can be generated 322 to conserve resources and speed comparison, particularly for profiles with a large call stacks. These profiles (or hashes or bloom filters for the profiles) can then be stored 324 for subsequent analysis and comparison.

Various other types of data can be used to generate specific profiles as well within the scope of the various embodiments. For example, profiles can be used to model behavior by specific contacts or caller identities. Specific types of callers or calls with specific aspects or attributes can also be used to attempt to improve the confidence of an anomaly determination for specific circumstances. Certain addresses or callers might also be blacklisted, whitelisted, or have other processing or access designations that can also impact how calls are processed through the anomaly detection process.

Figure 4:
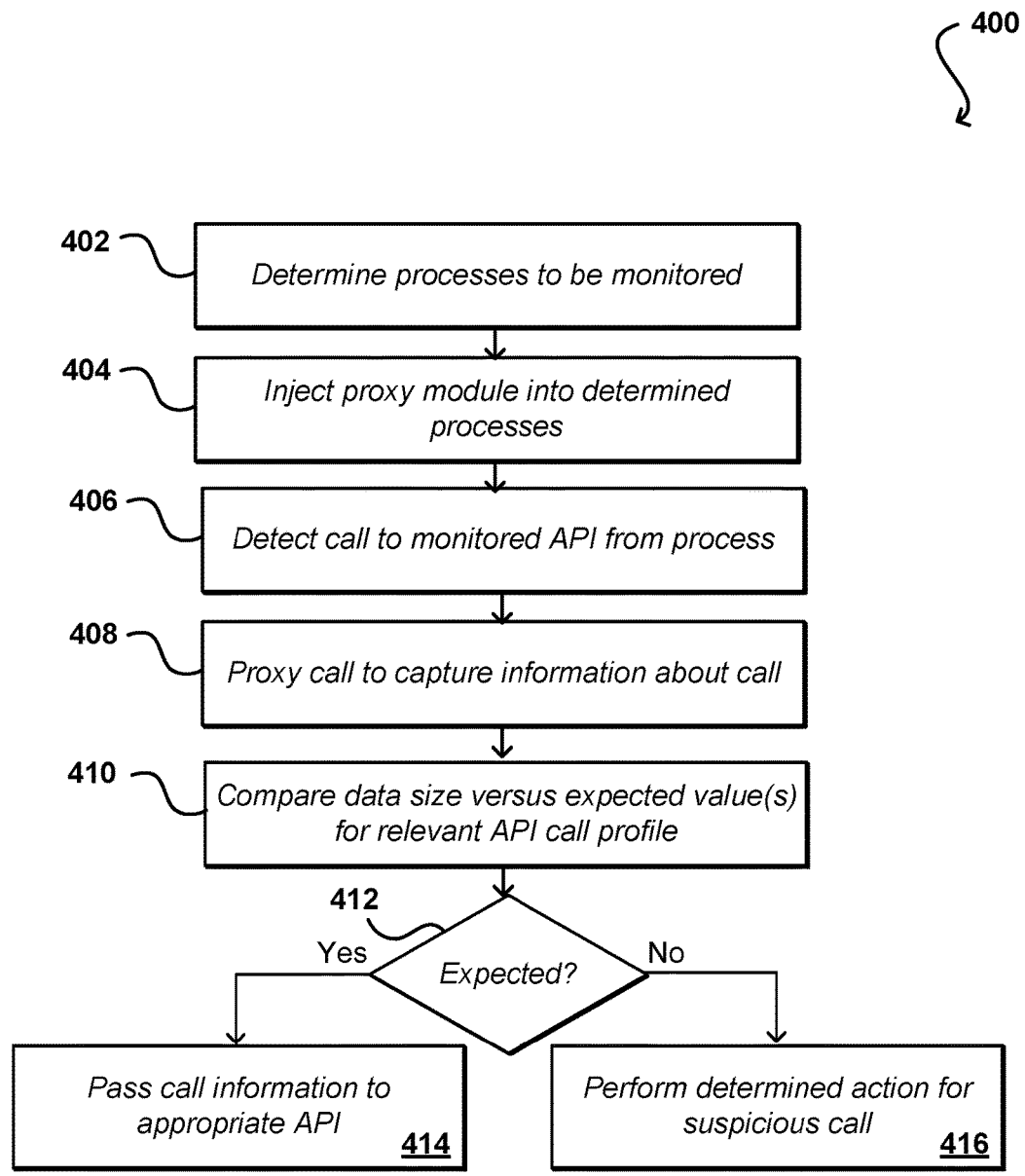
FIG. 4 illustrates an example process for analyzing API calls to attempt to detect suspicious calls that can be utilized in accordance with various embodiments.

FIG. 4 illustrates an example process 400 for using these or other such profiles to detect suspicious API calls that can be used in accordance with various embodiments. In this example, the processes to be monitored with respect to one or more APIs can be determined 402. As mentioned, these can be processes executed by, or on behalf of, various customers or other such entities. These processes can be analyzed to determine whether the processes have the appropriate proxying code or instructions contained therein. For any that do not include the proxying code, the proxy module can be injected 404 into the process(s) to enable calls to the vairous APIs to be proxied for those processes. When a call to a monitored API is subsequently detected 406 for one of those processes, the call can be proxied 408 in order to capture information about that call, such as the data size, source, and call path for the call. The data size for the call can then be compared 410 against the relevant API call profile, which can be determined based at least in part upon the granularity of the profiles, such as whether profiles are established based on API only, call source, call stack, or other such metrics. The data size can be compared to the expected size, sizes, or range of sizes to determine 412 whether the data size for the call falls within an expected range of values, which as mentioned could be within an expected range or a standard deviation of one or more expected values, among other such options. If the value for the call is within an expected range, for example, then the call can be pass 414 to the appropriate API for processing. If the data value for the call falls outside an expected range, however, a determined action can be performed 416 for the suspicious call. As discussed elsewhere herein, this can include actions such as logging or setting an alarm but allowing the call, or blocking the call and potentially blocking a source of the call, among other such actions.

Figure 5:
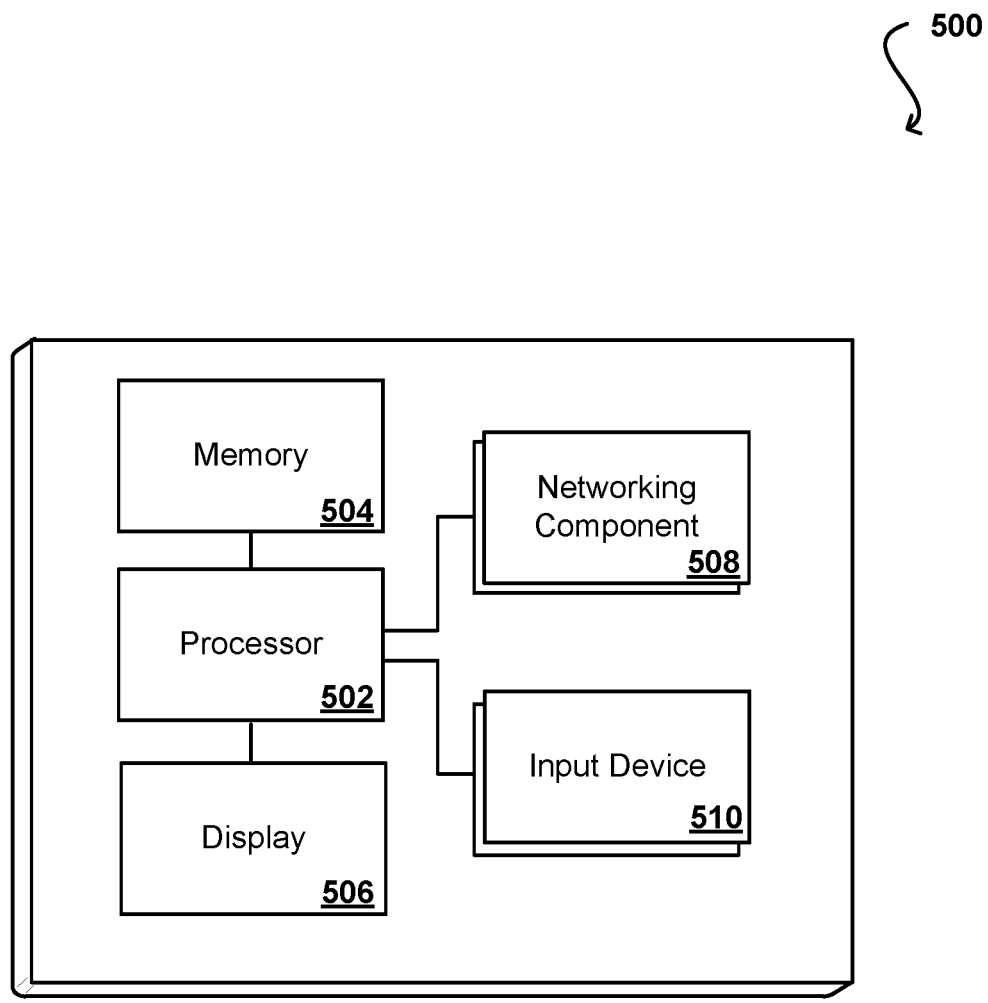
FIG. 5 illustrates example components of a computing device that can be used to implement aspects of various embodiments.

FIG. 5 illustrates a set of basic components of an example computing device 500 that can be utilized to implement aspects of the various embodiments. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the at least one processor 502, the same or separate storage can be used for images or data, a removable memory can be available for sharing information with other devices, and any number of communication approaches can be available for sharing with other devices. The device may include at least one type of display element 506, such as a touch screen, electronic ink (e-ink), organic light emitting diode (OLED) or liquid crystal display (LCD), although devices such as servers might convey information via other means, such as through a system of lights and data transmissions. The device typically will include one or more networking components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   detecting, over a baselining period, calls made to a memory management application programming interface (API);
   storing, for the calls, call length and call stack information, the call stack information indicating a call path from a source of the call to the API;
   aggregating, after an end of the baselining period, summary data pertaining to the call length and the call stack information;
   generating a set of profiles for the API, each profile of the set of profiles associated with a respective call stack and having at least one expected memory value determined from the summary data; and
   modifying, based at least in part upon an event, at least one profile of the set of profiles using at least one machine learning algorithm.

2. The computer-implemented method of claim 1, further comprising:
   determining, based at least in part on the summary data, at least one of an expected call length, an expected call length standard deviation, an expected call length range, or a set of discrete expected call length values; and
   determining the at least one expected memory value based on the at least one of the expected call length, the expected call length standard deviation, the expected call length range, or the set of discrete expected call length values.

3. The computer-implemented method of claim 1, further comprising:
   generating at least one respective hash based at least in part on the call stack information; and
   using the respective hash to identify the respective profile for a call to the memory management API.

4. The computer-implemented method of claim 1, wherein the event is at least one of receipt of additional data or a code change.

5. A computer-implemented method, comprising:
   detecting, over a baselining period, calls made to a memory management interface of a memory management system;
   storing, for each call, a memory value and call parameters;
   aggregating, after an end of the baselining period, summary data pertaining to the memory value and the call parameters;
   generating a set of profiles for the memory management interface, the set of profiles including a learned behavior profile for the memory management system, each profile of the set of profiles associated with respective call parameters and having at least one expected memory value determined from the summary data, wherein the at least one expected memory value is in a form to be compared against a memory value corresponding to a call to the memory management interface according to the respective profile; and
   modifying, based at least in part upon an event, the learned behavior profile using at least one machine learning algorithm.

6. The computer-implemented method of claim 5, wherein the memory value includes call length, the computer-implemented method further comprising:
   determining, based at least in part on the summary data, at least one of an expected call length, an expected call length standard deviation, an expected call length range, or a set of discrete expected call length values; and
   determining the at least one expected memory value based on the at least one of the expected call length, the expected call length standard deviation, the expected call length range, or the set of discrete expected call length values.

7. The computer-implemented method of claim 5, further comprising:
   determining a type of the call parameters, the type of the call parameters including at least one of a call source, an application programming interface (API) to which the call is directed, or a call stack for the call, the call stack indicating a call path from the call source to the memory management interface.

8. The computer-implemented method of claim 7, wherein the type of call parameters includes the call source, the computer-implemented method further comprising:
   determining, for each call, a call source, wherein the call source includes at least one of a process, a file, or a line number.

9. The computer-implemented method of claim 7, wherein the type of call parameters includes the call stack for the call, the computer-implemented method further comprising:
   generating at least one respective hash for at least a portion of each call stack for calls to the memory management interface and using the respective hash to identify the respective profile for the call to the memory management interface.

10. The computer-implemented method of claim 9, further comprising:
    compressing the at least one respective hash into a bloom filter.

11. The computer-implemented method of claim 5, further comprising:
    generating the learned behavior profile using at least one machine learning algorithm.

12. The computer-implemented method of claim 5, wherein the event is at least one of receipt of additional data or a code change.

13. A system, comprising:
    at least one processor; and
    memory including instructions that, when executed by the at least one processor, cause the system to:
        detect, over a baselining period, calls made to a memory management interface of a memory management system;
        store, for each call, a memory value and call parameters;
        aggregate, after an end of the baselining period, summary data pertaining to the memory values and the call parameters;
        generate a set of profiles for the memory management interface, the set of profiles including a learned behavior profile for the memory management system, each profile of the set of profiles associated with respective call parameters and having at least one expected memory value determined from the summary data, wherein the at least one expected memory value is in a form to be compared against a memory value corresponding to a call to the memory management interface according to the respective profile; and
        modify, based at least in part upon an event, the learned behavior profile using at least one machine learning algorithm.

14. The system of claim 13, wherein the memory value includes call length, and wherein the instructions when executed further cause the system to:
    determine, based at least in part on the summary data, at least one of an expected call length, an expected call length standard deviation, an expected call length range, or a set of discrete expected call length values; and
    determine the at least one expected memory value based on the at least one of the expected call length, the expected call length standard deviation, the expected call length range, or the set of discrete expected call length values.

15. The system of claim 13, wherein the instructions when executed further cause the system to:
    determine a type of the call parameters, the type of the call parameters including at least one of a call source, an application programming interface (API) to which the call is directed, or a call stack for the call, the call stack indicating a call path from the call source to the memory management interface.

16. The system of claim 15, wherein the type of call parameters includes the call source, and wherein the instructions when executed further cause the system to:
    determine, for each call, a call source, wherein the call source includes at least one of a process, a file, or a line number.

17. The system of claim 15, wherein the type of call parameters includes the call stack for the call, and wherein the instructions when executed further cause the system to:
    generate at least one respective hash for at least a portion of each call stack for calls to the memory management interface and using the respective hash to identify the respective profile for the call to the memory management interface.

18. The system of claim 17, wherein the instructions when executed further cause the system to:
    compress the at least one respective hash into a bloom filter.

19. The system of claim 13, wherein the instructions when executed further cause the system to:
    generate the learned behavior profile using at least one machine learning algorithm.

20. The system of claim 13, wherein the event is at least one of receipt of additional data or a code change.

\* \* \* \* \*